Jan. 1, 1924. 1,479,625
W. L. PALMER ET AL
CASING HEAD AND BLOW-OUT PREVENTER
Filed Feb. 19, 1923 2 Sheets-Sheet 2

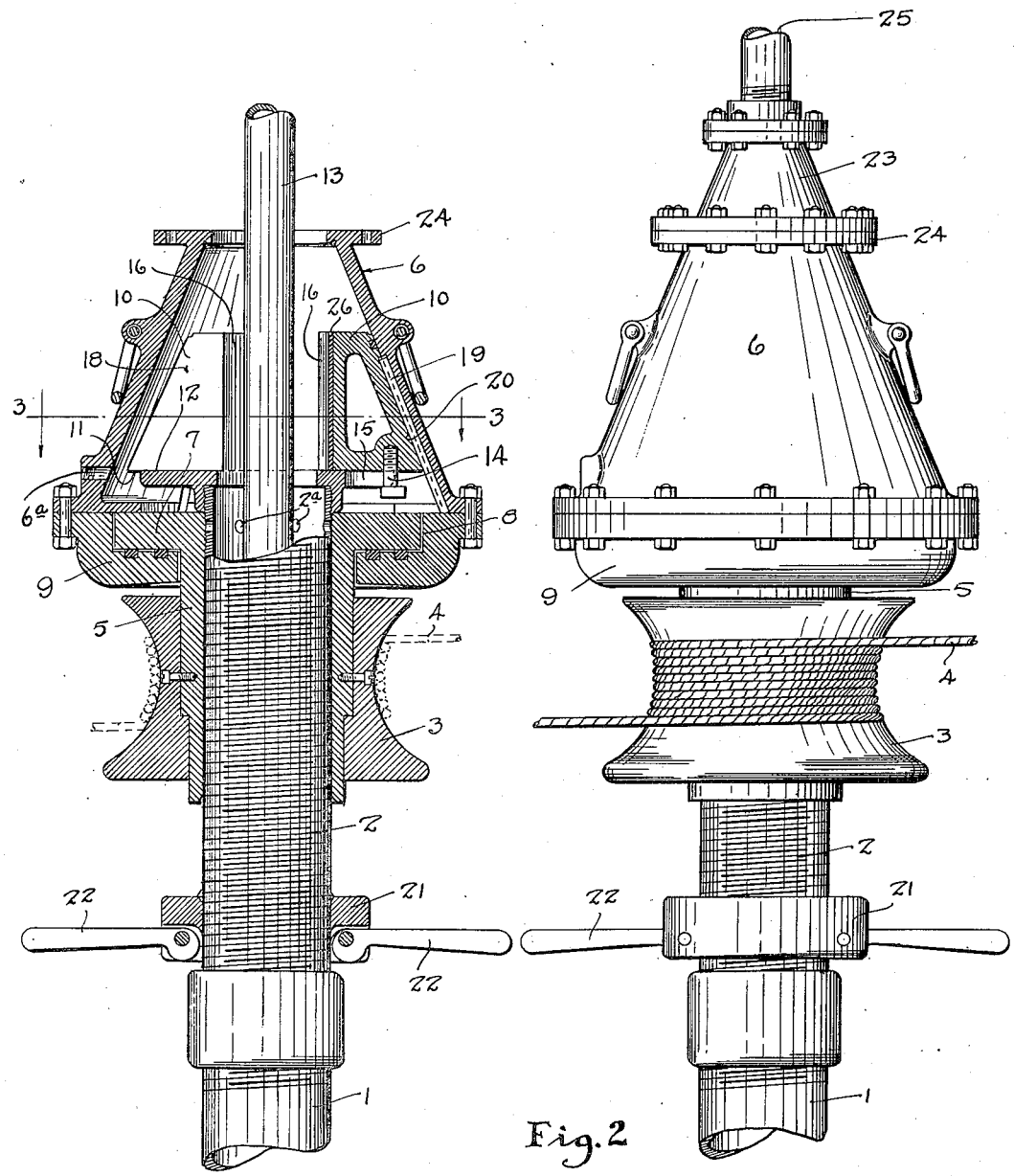

Inventors
William Lee Palmer
Marshall Mitchell
By Lyon+Lyon
Attys

Patented Jan. 1, 1924.

1,479,625

UNITED STATES PATENT OFFICE.

WILLIAM LEE PALMER AND MARSHALL MITCHELL, OF LONG BEACH, CALIFORNIA, ASSIGNORS OF ONE-THIRD TO GEORGE KAMMERER, OF LOS ANGELES, CALIFORNIA.

CASING HEAD AND BLOW-OUT PREVENTER.

Application filed February 19, 1923. Serial No. 619,933.

*To all whom it may concern:*

Be it known that we, WILLIAM LEE PALMER and MARSHALL MITCHELL, residing at Long Beach, in the county of Los Angeles and State of California, have invented a new and useful Casing Head and Blow-Out Preventer, of which the following is a specification.

This invention relates to oil well apparatus. The general object of the invention is to provide simple means for controlling the casing head under conditions where the well has come in as a gusher or has caught fire. More specifically, the general object is to provide means for closing the outlet between an inner casing and an outer casing, and to provide for operating the closing means from a distance. As described in the following specification, the invention embodies the use of slips or slip blocks which move inwardly against the inner casing and close off the outlet of the outer casing, and one of the objects of our invention is to effect the closing movement of the slips without rotating the slips; this is desirable in order to prevent dislocating the packing which we place on the face of the slips where they engage casing walls.

The invention consists in the novel parts and combination of parts to be described hereinafter, all of which contribute to produce an efficient casing head and blow-out preventer.

A preferred embodiment of the invention is described in the following specification, while the broad scope of the invention is pointed out in the appended claims.

In the drawing:—

Figure 1 is a vertical section through a casing head, embodying our invention and showing the upper portion of the casing partly in elevation and partly in section.

Fig. 2 is a side elevation of the apparatus shown in Figure 1, but also illustrates a cap placed on the casing head for permanently connecting the head to the oil line.

Figure 3:
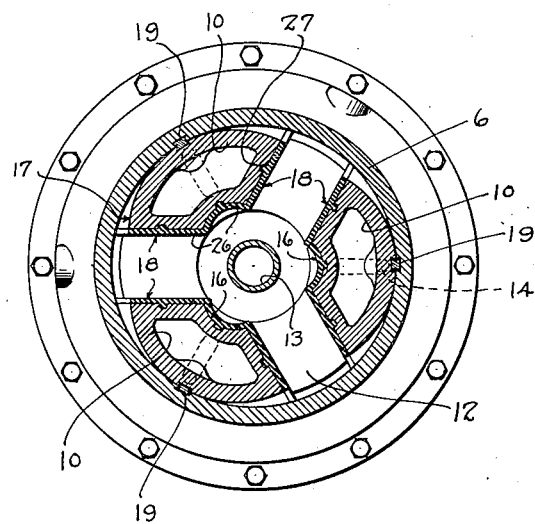
Fig. 3 is a horizontal section taken on the line 3—3 of Figure 1.

In practicing our invention, we provide means mounted within the casing head, normally held in a retracted position, but capable of moving inwardly so as to fit against the inner casing. This result is most conveniently effected by means of a plurality of slips mounted within a conical head. By producing a relative movement of the slips with respect to the conical head they not only clamp around the inner casing, but they also operate as a plug or closure for the upper or small end of the conical head. The relative movement of the slips and the conical head may be accomplished by any suitable means; however, the movement is preferably effected without producing a rotation of the slips or slip blocks on the inner casing, as they move against it, and we thereby avoid a tendency of the casing walls to dislodge the packing which we employ on the faces of the slips. This packing effects a substantially gas-tight or oil-tight joint or seal around the inner casing. Any other of the contacting faces may be sealed in this way.

In order to accomplish this, we prefer to provide the upper end of the outer casing 1 with external threads 2 (see Figure 1) and on these threads we mount a drum 3 which may be rotated from a distance by means of a cable 4. This drum operates as a nut on the thread and for this purpose is provided with a bushing 5 to which it is rigidly secured, the bushing being provided with thread to engage the thread 2.

The upper end of the bushing preferably has a swivel connection with a conical head 6, and for this purpose it has an outwardly projecting flange 7 which is received in a counterbore 8 formed in a swivel collar secured to the lower and large end of the cone 6.

Within the conical head or cone 6, we provide a plurality of slips or slip blocks 10; in the present instance we have illustrated three of these slips, but there may be a smaller or larger number of them as may be desired. Each slip is of tapered or wedge form with its small end upward, and the bottom faces 11 of these slips are supported on the upper end of the casing 1. For this purpose, we provide the upper end of the outer casing with a thrust collar 12 on which the slips rest and on which they are guided to slide outwardly, or inwardly toward the inner casing 13. Any suitable guiding means may be provided, but in the present instance, this consists of a bolt 14 carried by the lower end of each slip and running in a radial slot 15 formed in the flange of the thrust collar. The inner side of each slip is formed with a concave face 16 which is cylindrical and of the proper radius to engage and fit closely against the outer face of the inner casing 13. The slips also have radially disposed faces 18, which are adapted to abut against each other when the slips are in their closed position. We also prefer to provide means for guiding the outer or conical faces 17 of the slips on the wall of the conical head, and for this purpose, we provide a spline 19 to correspond with each slip and engaging the middle of its conical face, each slip being provided with a corresponding dovetail groove 20 to receive the spline.

With this organization of parts, it will be evident that by producing a relative movement of the cone and slips in a vertical direction, the slips will be made to move inwardly and engage the inner casing. Figure 1 shows the slips in their retracted position, leaving the outlet from the outer casing completely open. With the slips in this position, if the drum 3 is rotated, for example by means of a cable 4, the bushing 5 will move downwardly on the thread 2 and this will pull down the cone or conical head 6; in this downward movement the cone cooperates with the slips or slip-blocks 10 to force the same inwardly and clamp them against the inner casing. In other words, the same effect is produced as though the conical slips were forced upwardly in the conical head, as they not only jam against the inner casing, but they also jam in and plug the outlet through the upper part of the cone.

After the slips have been moved into their closed position, the bushing 5 may be locked in this posiiton by means of a lock-nut or collar 21 mounted on the thread 2 of the casing below the bushing and provided with handles or levers 22 for facilitating its rotation.

It will be evident that this apparatus will operate effectively to enable the outlet from the outer casing to be closed off in case the well comes in as a gusher, and they also will enable the outlet from the outer casing to be shut off effectively in case the well has caught fire.

After the well has been brought in successfully, we attach a cap 23 on the upper flange 24 of the conical head 6, and this cap connects with a pipe connection 25 leading to the oil line.

The concave faces 16 and the radial side faces 18 of the slips are provided with packing, for example a packing sheet or gasket 26 of any suitable packing material, and these packing sheets may be anchored in place by means of small projections 27, which extend back into the material of the slip.

Figure 4:
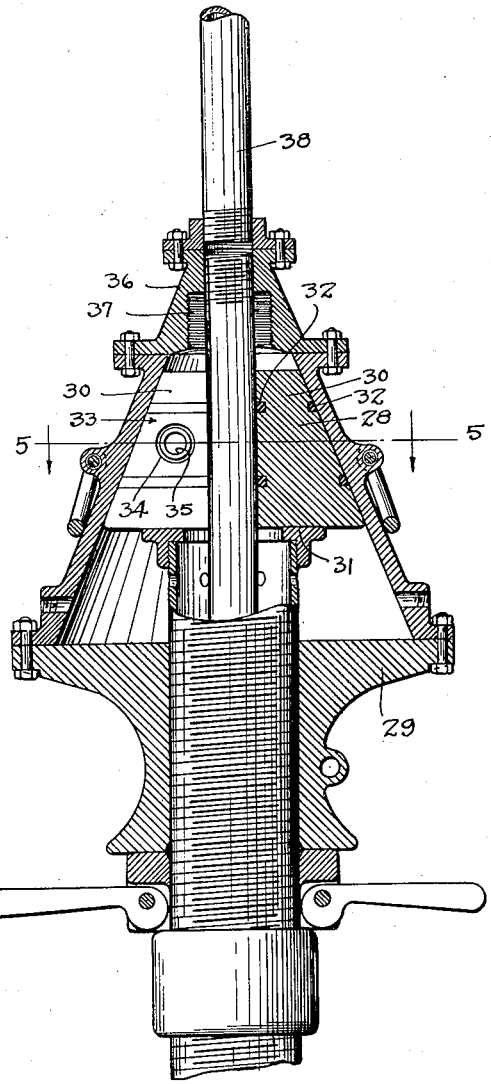
Fig. 4 is a view similar to Figure 1, but showing another embodiment of the invention. This view shows the outer casing closed instead of open as illustrated in Figure 1, and, Fig. 5 is a horizontal section taken on the line 5—5 of Figure 4.
Figure 5:
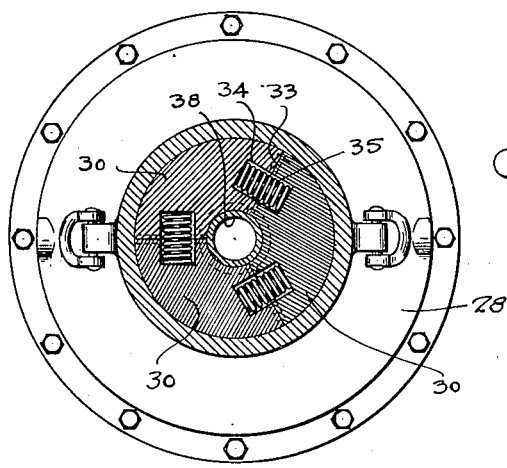

In Figure 4 is illustrated another embodiment of the invention in which the construction is substantially the same as that already described except that we dispense with the swivel connection between the drum 3 and the conical head 28. That is to say, in effecting this connection we attach the drum 29 directly to the lower end of the conical head. In this embodiment there is also no guiding connection or spline connecting the slips 30 with the conical head. The slips are of the same form as the slips 10 already described, but merely rest on the upper side of a thrust collar 31. And the packing is effected by means of circular packing rings 32 received in suitable grooves cut in the inner and outer faces of the slips.

In order to effect the separating movement of the conical slips their radial faces 33 are provided with spring pockets or chambers 34 which register with each other and receive coil springs 35. With this organization of parts, it will be evident that after the outer casing has been closed off, the upward movement of the conical head will permit the springs to move the slips back to their normal retracted position.

If desired, the cap 36 (see Figure 4) may be provided with a threaded bore 37 to receive and support an inner casing of a larger diameter than the inner casing 38 which is illustrated in this view.

The upper end of the outer casing is provided with relief vents 2$^a$, (see Figure 1,) and similar vents 6$^a$ are provided in the head 6.

It is understood that the embodiment of the invention described herein is only one of the many embodiments this invention may take and we do not wish to be limited in the practice of our invention nor in our claims to the particular embodiment set forth.

What we claim is:—

1. In oil well apparatus, the combination of an outer casing, a substantially conical head mounted over the outer casing, an inner casing passing upwardly through the outer casing and through the conical head, a plurality of slips within the conical head normally held in a retracted position with respect to the inner casing and means for producing a relative movement between the slips and the conical head operating to jam the slips toward the small end of the head and thereby close the outlet from the outer casing.

2. In oil well apparatus, the combination of an outer casing, a substantially conical head mounted over the outer casing, an inner casing passing upwardly through the outer casing and through the conical head, a plurality of slips within the conical head normally held in a retracted position with respect to the inner casing, and means mounted on the casing and movable downwardly on the casing for pulling the conical head downwardly, and operating to jam the slips in the small end of the head to close the outlet from the outer casing.

3. In oil well apparatus, the combination of an outer casing, a substantially conical head mounted over the outer casing, an inner casing passing upwardly through the outer casing, and through the conical head, a plurality of slips within the conical head resting on the outer casing and normally held in a retracted position with respect to the inner casing, and means for pulling the conical head downwardly, said head operating to force the slips inwardly against the inner casing so that they co-operate to close the oulet from the outer casing.

4. In oil well apparatus, the combination of an outer casing, a substantially conical head mounted over the outer casing, an inner casing passing upwardly through the outer casing, and through the conical head, a plurality of slips within the conical head resting on the outer casing and normally held in a retracted position with respect to the inner casing, the upper end of said outer casing having external threads, a nut rotatably mounted on the said threads and having means for rotating the same, said nut having a swivel connection with said conical head and operating when rotated to pull the conical head downwardly without rotating the same, said conical head operating to force the slips inwardly against the inner casing so that the slips operate to close the upper end of the conical head around the inner casing and thereby close the outlet from the outer casing.

5. In oil well apparatus, the combination of an outer casing, a substantially conical head mounted over the outer casing, an inner casing passing upwardly through the outer casing and through the conical head, a thrust collar within the conical head and carried by the upper end of the outer casing, a plurality of slips within the conical head resting on the thrust collar and guided thereby to slide outwardly or inwardly toward the inner casing, said slips normally held in a retracted position with respect to the inner casing, and means for pulling the conical head downwardly, said head and slips co-operating to force the slips inwardly against the inner casing and to close the upper end of the conical head, thereby closing the outlet from the outer casing.

6. In oil well apparatus, the combination of an outer casing, a substantially conical head mounted over the outer casing, an inner casing passing upwardly through the outer casing and through the conical head, a thrust collar within the conical head and carried by the upper end of the outer casing, a plurality of slips within the conical head resting on the thrust collar and guided thereby to slide outwardly or inwardly toward the inner casing, means for guiding the outer sides of the slips on the wall of the conical head, and means for pulling the conical head downwardly, said head and slips co-operating to force the slips inwardly against the inner casing and to close the upper end of the conical head, thereby closing the outlet from the outer casing.

7. In oil well apparatus, the combination of an outer casing, a substantially conical head mounted over the outer casing, an inner casing passing upwardly through the outer casing, and through the conical head, a plurality of slips within the conical head resting on the outer casing and normally held in a retracted position with respect to the inner casing, said outer casing having external threads, a drum having a bushing engaging the threads and operating as a nut when the drum is rotated, to move up or down on the outer casing, the upper end of said bushing having a flange, and a swivel collar carried by the lower end of the conical head engaging the flange whereby the rotation of the drum will pull the conical head downwardly without rotating the same, the downward movement of the conical head operating to move the slips inwardly against the inner casing and jam the same in the upper end of the conical head, thereby closing the outlet from the outer casing.

Signed at Los Angeles, California, this 10th day of February, 1923.

WILLIAM LEE PALMER.
MARSHALL MITCHELL.